(12) United States Patent
Aue

(10) Patent No.: US 8,134,071 B2
(45) Date of Patent: Mar. 13, 2012

(54) APPARATUS FOR A CONNECTION POINT BETWEEN TWO ELECTRICAL HIGH-VOLTAGE CABLES

(75) Inventor: Volker Aue, Dortmund (DE)

(73) Assignee: Nexans, Paris (FR)

( * ) Notice: Subject to any disclaimer, the term of this patent is extended or adjusted under 35 U.S.C. 154(b) by 171 days.

(21) Appl. No.: 12/551,689

(22) Filed: Sep. 1, 2009

(65) Prior Publication Data

US 2010/0101835 A1    Apr. 29, 2010

(30) Foreign Application Priority Data

Oct. 28, 2008  (EP) .................................... 08291009

(51) Int. Cl.
*H01R 4/00*  (2006.01)
(52) U.S. Cl. ..................................... 174/88 R
(58) Field of Classification Search ............... 174/73.1, 174/88 R
See application file for complete search history.

(56) References Cited

U.S. PATENT DOCUMENTS

| 4,238,639 | A  | * | 12/1980 | Palmieri ....................... | 174/73.1 |
| 4,485,269 | A  | * | 11/1984 | Steinberg .................... | 174/84 R |
| 7,170,004 | B2 | * | 1/2007  | Gramespacher et al. .... | 174/73.1 |
| 2006/0272842 | A1 | * | 12/2006 | Vallauri et al. ............... | 174/73.1 |

FOREIGN PATENT DOCUMENTS

DE    4209831    9/1993

* cited by examiner

*Primary Examiner* — Chau Nguyen
(74) *Attorney, Agent, or Firm* — Sofer & Haroun, LLP

(57) ABSTRACT

An apparatus is provided for a connection point between a paper-insulated electrical high-voltage cable, which is impregnated with an insulating medium which can flow, and a plastic-insulated electrical high-voltage cable, in which an end termination, which is surrounded by a pressure-resistant partition isolator (12), is provided at the end of the paper-insulated high-voltage cable, and in which the connection point of the conductors of the two high-voltage cables is surrounded by electrical screening elements and a sleeve body (18). The sleeve body (18) is in the form of an elongated, integral component composed of elastic insulating material with an aperture hole for holding the two high-voltage cables (3, 4), and the sleeve body (18) is equipped at its two axial ends, which are intended to hold the high-voltage cables (3, 4), with electrical control funnels (21, 22) which, in the fitted position, rest on electrically conductive layers of the two high-voltage cables (3, 4). The internal diameters of the aperture hole in the sleeve body (18) at its two axial ends which are equipped with the control funnels (21, 22) are of different defined sizes, in order to hold the two high-voltage cables (3, 4), whose external diameters differ by at least 10 mm in the contact areas of the sleeve body (18), matched to these different external diameters.

6 Claims, 1 Drawing Sheet

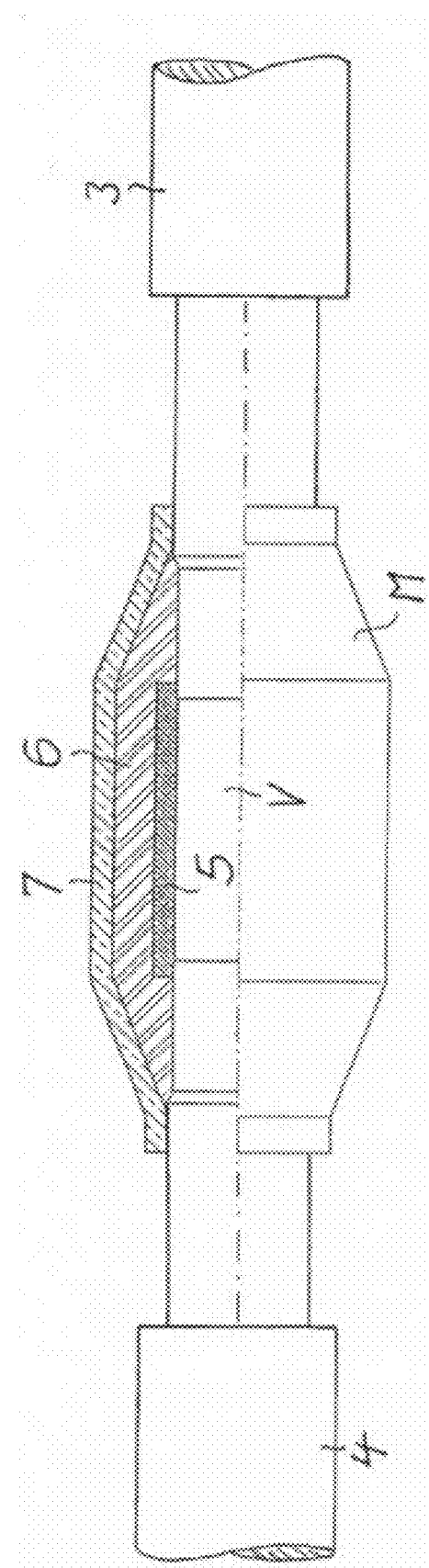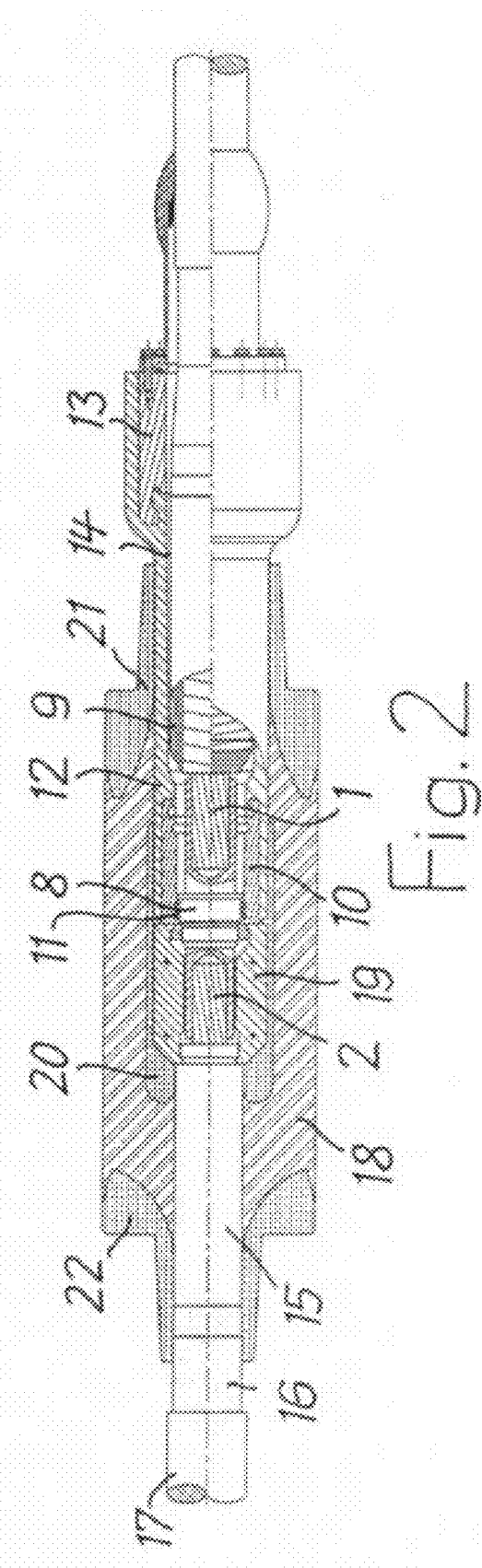

APPARATUS FOR A CONNECTION POINT BETWEEN TWO ELECTRICAL HIGH-VOLTAGE CABLES

RELATED APPLICATION

This application claims the benefit of priority from European Patent Application No. 08291009.2. filed on Oct. 28, 2008, the entirety of which is incorporated by reference.

BACKGROUND

1. Field of the Invention

The invention relates to an apparatus for a connection point between a paper-insulated electrical high-voltage cable, which is impregnated with an insulating medium which can flow, and a plastic-insulated electrical high-voltage cable, in which an end termination, which is surrounded by a pressure-resistant partition isolator, is provided at the end of the paper-insulated high-voltage cable, and in which the connection point of the conductors of the two high-voltage cables is surrounded by electrical screening elements and a sleeve body (DE 42 09 831 C2).

2. Description of Related Art

An apparatus or a junction sleeve such as this is required to connect high-voltage cables, which have already been laid and are still in use, and whose paper insulation is impregnated with an insulating medium which can flow, to normal modern, plastic-insulated high-voltage cables. In known technology, oil or gas, for example nitrogen, are used as impregnation means for the first-mentioned high-voltage cables. These cables may be gas external-pressure cables, gas internal-pressure cables, low-pressure oil cables or high-pressure oil cables. In the following text, the word "paper cable" is used to represent all the possible embodiments. The plastic-insulated cable is referred to in the following text as a "plastic cable", for the sake of simplicity.

At the ends which are intended to be connected to another high-voltage cable, the paper cable has a partition isolator, which is composed of epoxy resin by way of example, for pressure-tight closure. The partition isolator is shaped around the cable end, enclosing a circumferential annular gap, for the impregnation means to pass through. It has a relatively large external diameter, as an effective end closure. The connection point of a paper cable such as this to a plastic cable requires a correspondingly larger degree of complexity, because the external diameter of a plastic cable is considerably less than the external diameter of the partition isolator.

In the case of the known apparatus, which is referred to as a junction sleeve, according to the initially cited DE 42 09 831 C2, a winding composed of conductive strips is fitted around the connection point between the conductors of the paper cable and of the plastic cable. Sleeve insulation is located above the winding and is composed, for example, of self-welding strips based on ethylene-propylene rubber, which is wound on subject to tensile stress. The sleeve insulation has a constant external diameter and projects with correspondingly different thickness dimensions on the one hand to beyond the plastic cable and its exposed layers, and on the other hand to beyond the partition isolator of the paper cable. The entire connection point is surrounded by an aluminium foil as a diffusion barrier and by shrink sleeves as mechanical protection. In addition, this junction sleeve can be protected by a housing composed of glass-fibre-reinforced plastic. Overall, the production of this connection point or junction sleeve requires a considerable amount of effort.

OBJECTS AND SUMMARY

The invention is based on the object of designing the apparatus described initially in a simpler form.

According to the invention, this object is achieved:

in that the sleeve body is in the form of an elongated, integral component composed of elastic insulating material with an aperture hole for holding the two high-voltage cables, in that the sleeve body is equipped at its two axial ends, which are intended to hold the high-voltage cables, with electrical control funnels which, in the fitted position, rest on electrically conductive layers of the two high-voltage cables, and in that the internal diameters of the aperture hole in the sleeve body at its two axial ends which are equipped with the control funnels are of different defined sizes, in order to hold the two high-voltage cables, whose external diameters differ by at least 10 mm in the contact areas of the sleeve body, matched to these different external diameters.

When using this integral sleeve body, a paper cable and a plastic cable, which have a considerable difference in diameter in particular because of the partition isolator of the paper cable, can be connected to one another in a simple manner. The sleeve body can be prefabricated with conventional components as an integral structure, which means that its electrical functionality can be tested in the factory. The internal diameters of the two openings of the aperture hole which are provided at the ends of the sleeve body are of such sizes that the aperture hole can be pushed onto one of the cables, preferably onto the plastic cable, on the one hand without any risk of overstretching, before the through-connection of the two conductors. On the other hand, at both ends, the sleeve body is pressed with the control funnels located there, despite the greatly different external diameters of the contact surfaces of the two cables, with a defined force against the outer conductive layers thereof, to be precise with at least approximately the same force on both cables. This is of major importance for the functionality of the sleeve body since the sleeve body can follow temperature fluctuations in particular, without damage, as a result of the defined sizes of the ends of the aperture hole, with these temperature fluctuations being those which occur during operation of a cable section. Furthermore, because of this integral sleeve body, no additional insulating fluid with associated monitoring devices is required.

The differences in the internal diameters of the two ends of the aperture hole advantageously correspond to the differences between the external diameters of the corresponding contact surfaces of the two cables.

BRIEF DESCRIPTION OF THE DRAWINGS

One exemplary embodiment of the subject matter according to the invention is illustrated in the drawings, in which:

FIG. 1 shows, schematically, the basic design of a connection point between two high-voltage cables, in the form of a section.

FIG. 2 shows a section through an apparatus according to the invention.

DETAILED DESCRIPTION

Conductors 1 and 2, which can be seen in FIG. 2, of two high-voltage cables 3 and 4 are electrically conductively connected to one another in a connection point V. A connection sleeve M is fitted over the connection point V and, as a prefabricated component, may have a conductive screen 5 and a moulding 6 composed of elastic insulating material, to which a conductive outer coating 7 can be applied. The coating 7 makes electrically conductive contact with outer electrically conductive layers of the two cables 3 and 4. The connection sleeve M is seated with an interference fit on the parts surrounded by it.

The conductors 1 and 2 may be formed from a plurality of wires or may be solid. They may be round or may be in the form of segments. They may be composed of copper or aluminium. The conductors 1 and 2 are each surrounded by an inner guide layer, which is also referred to as conductor smoothing. This inner guide layer is not illustrated in the drawing.

In the apparatus according to the invention, the high-voltage cable 3 is a paper cable 3, and the high-voltage cable 4 is a plastic cable 4.

The configuration of the paper cable 3 is known per se, and has an outer casing composed of metal. Its conductor 1 is exposed for connection to the conductor 2 of the plastic cable 4. A connection piece 8, which is preferably composed of copper, is used for the connection of the two conductors 1 and 2. This connection piece 8 is advantageously composed of the same material as the conductors 1 and 2. The end of the insulation of the paper cable 3 is thickened by paper layers 9. A coupling electrode 10 is fitted over the connection piece 8 in the area of the conductor 1 and is hermetically sealed at its end facing away from the paper cable 3, with respect to the connection piece 8, by a seal 11. The end of the paper cable 3 is surrounded all round by a partition isolator 12, which for example is composed of epoxy resin, in order to form an end closure. The coupling electrode 10 is encapsulated in the partition isolator 12 in a liquid-tight and gas-tight manner. A metal sleeve 13 is encapsulated in a liquid-tight and gas-tight manner at the other end of the partition isolator 12, and a funnel which is connected to the casing of the paper cable 3 is screwed to this metal sleeve 13. A circumferential gap 14 for the impregnation means, for example an insulating oil, to pass through remains between the partition isolator 12 and those parts of the paper cable 3 which are surrounded by the same.

The configuration of the plastic cable 4 is likewise known per se. An inner guide layer composed of electrically conductive material is fitted as conductor smoothing over the conductor 2 of the plastic cable 4, using normal technology, and is surrounded by insulation. In general, the insulation is composed of crosslinked polyethylene. An outer guide layer 16 composed of electrically conductive material is applied to the insulation 15 of the plastic cable 4 and is surrounded by an outer casing 17 composed of insulating material. In order to produce the connection point to the paper cable 3, the outer casing 17 and the outer guide layer 16 are removed over appropriate, different lengths.

The apparatus according to the invention is illustrated in the form of an exemplary embodiment in FIG. 2. This comprises an integral sleeve body 18 composed of insulating material, which covers the connection point between the paper cable 3 and plastic cable 4, whose external diameters differ to a major extent at the contact points of the sleeve body 18. The external diameter over the insulation 15 and the external guide layer 16 of the plastic cable 4 should therefore be at least 10 mm less than the external diameter of the partition isolator 12 of the paper cable 3. The conductors 1 and 2 of the two cables 3 and 4 in the illustrated exemplary embodiment have the same dimensions and are configured identically. However, they may also have different dimensions, with correspondingly changed or adapted thickness of the insulation on the two cables 3 and 4. In the area of the conductor 2, a filling piece 19 is fitted over the connection piece 8, which filling piece 19 is composed, for example, of aluminium and has an external diameter which corresponds to the external diameter of the partition isolator 12. A screening electrode 20 is arranged around the connection point between the two conductors 1 and 2 overall, with all the described individual parts. This is a component of the sleeve body 18 and is advantageously composed of the same material, which has been made electrically conductive, as said sleeve body.

The entire connection point is surrounded by the sleeve body 18 composed of elastic, preferably permanently elastic, insulating material, at each of whose two ends a control funnel 21 and 22 is fitted. In the same way as the screening electrode 20, the sleeve body 18 is advantageously composed of an ethylene-propylene terpolymer (EPDM), or of silicone rubber. The control funnels 21 and 22 are integrated in the sleeve body 17. They are likewise advantageously composed of the same material as the sleeve body 18, and are made electrically conductive. The control funnels 21 and 22 rest with a defined interference fit on the respective electrically conductive outer layer, at the ends of the two cables 3 and 4.

The "interior" of the sleeve body 18 is matched to the different external diameters of the insulation 15 and outer guide layer 16 and partition isolator 12, and to the filling piece 19. It has an aperture hole with a correspondingly stepped profile and, at its two axial ends, has internal diameters which are likewise greatly different, in the same way as the external diameters of the contact surfaces of the two cables 3 and 4. The difference between the internal diameters at the ends of the aperture hole is advantageously likewise at least 10 mm, matching the external diameters of the contact surfaces of the two cables 3 and 4.

The internal diameters of the openings at the ends of the aperture hole in the sleeve body 18 are of such sizes, and in defined manner, that the sleeve body 18 and its control funnels 21 and 22 rest with a predetermined interference fit on the insulation 15 and the outer guide layer 16 on the one hand, and on the partition isolator 12 on the other hand. When the sleeve body 18 is in the rest state, they are advantageously undersized in comparison to the external diameters of the contact surfaces of the two cables 3 and 4, such that they must be widened by at least 8% in order to rest adequately firmly on the respective electrical boundary layer of the two cables 3 and 4 in the installed position. An upper limit for the required widening of the aperture hole at the ends of the sleeve body 18 is about 33%.

The procedure for assembly of the apparatus according to the invention is, for example, as follows:

After preparation of the ends of the two cables 3 and 4 to be connected corresponding to the above description, the sleeve body 18 is fitted. With its aperture hole being appropriately widened, it can advantageously be pushed onto the end of the plastic cable 4 to a parking position. The conductor 2 of the plastic cable 4 is then electrically conductively connected to the connection piece 8 at the end of the conductor 1 of the paper cable 3. The filling piece 19 is fitted at the end of the partition isolator 12, over the connection point of the two conductors 1 and 2. Finally, the sleeve body 18 is moved to its final position, in which the screening electrode 20 rests on the filling piece 19, and in which its control funnels 21 and 22 rest with an interference fit on the outer guide layer 16 of the plastic cable 4 and on the partition isolator 12 of the paper cable 3.

Once the sleeve body 18 has been fitted, an outer sheath can be fitted over it. The electrically conductive screens provided in the configuration of the cables 3 and 4 can be connected through a sheath such as this. Instead of this type of sheath, a metal housing with an insulating casing can also be fitted around the sleeve body 18.

The invention claimed is:

1. Apparatus for a connection point between a paper-insulated electrical high-voltage cable, which is impregnated with an insulating medium which can flow, and a plastic-insulated electrical high-voltage cable, in which an end termination, which is surrounded by a pressure-resistant partition isolator, is provided at the end of the paper-insulated high-voltage cable, and in which the connection point of the conductors of the two high-voltage cables is surrounded by an apparatus comprising:
    electrical screening elements; and
    a sleeve body, wherein
        the sleeve body is in the form of an elongated, integral component composed of elastic insulating material with an aperture hole for holding the two high-voltage cables,
        in that the sleeve body is equipped at its two axial ends, which are intended to hold the high-voltage cables, with electrical control funnels which, in the fitted position, rest on electrically conductive layers of the two high-voltage cables, and
        in that the internal diameters of the aperture hole in the sleeve body at its two axial ends which are equipped with the control funnels are of different defined sizes, in order to hold the two high-voltage cables, whose external diameters differ by at least 10 mm in the contact areas of the sleeve body, matched to these different external diameters.

2. Apparatus according to claim 1, wherein the difference between the internal diameters of the aperture hole at the two axial ends of the sleeve body is equal to the difference between the external diameters of the two contact surfaces of the plastic-insulated high-voltage cable on the one hand and the partition isolator on the other hand.

3. Apparatus according to claim 1, wherein the aperture hole in the sleeve body has an internal diameter at its ends which is undersize in comparison to the contact surfaces of the two high-voltage cables, requiring the aperture hole to be widened by at least 8% in order to reach the fitting position.

4. Apparatus according to claim 1, wherein the sleeve body is composed of an ethylene-propylene terpolymer or of silicone rubber.

5. Apparatus according to claim 1, wherein, in order to form the control funnels, the axial ends of the sleeve body are composed of ethylene-propylene terpolymer or silicone rubber which has been made electrically conductive.

6. Apparatus according to claim 1, wherein a screening electrode composed of ethylene-propylene terpolymer or silicone rubber which has been made electrically conductive is fitted over the connection point of the conductors of the two high-voltage cables.

* * * * *